May 9, 1939.   B. BROWNSTEIN   2,157,996
UNIVERSAL FLEXIBLE AND SAFETY COUPLING
Filed Aug. 9, 1938   2 Sheets-Sheet 2
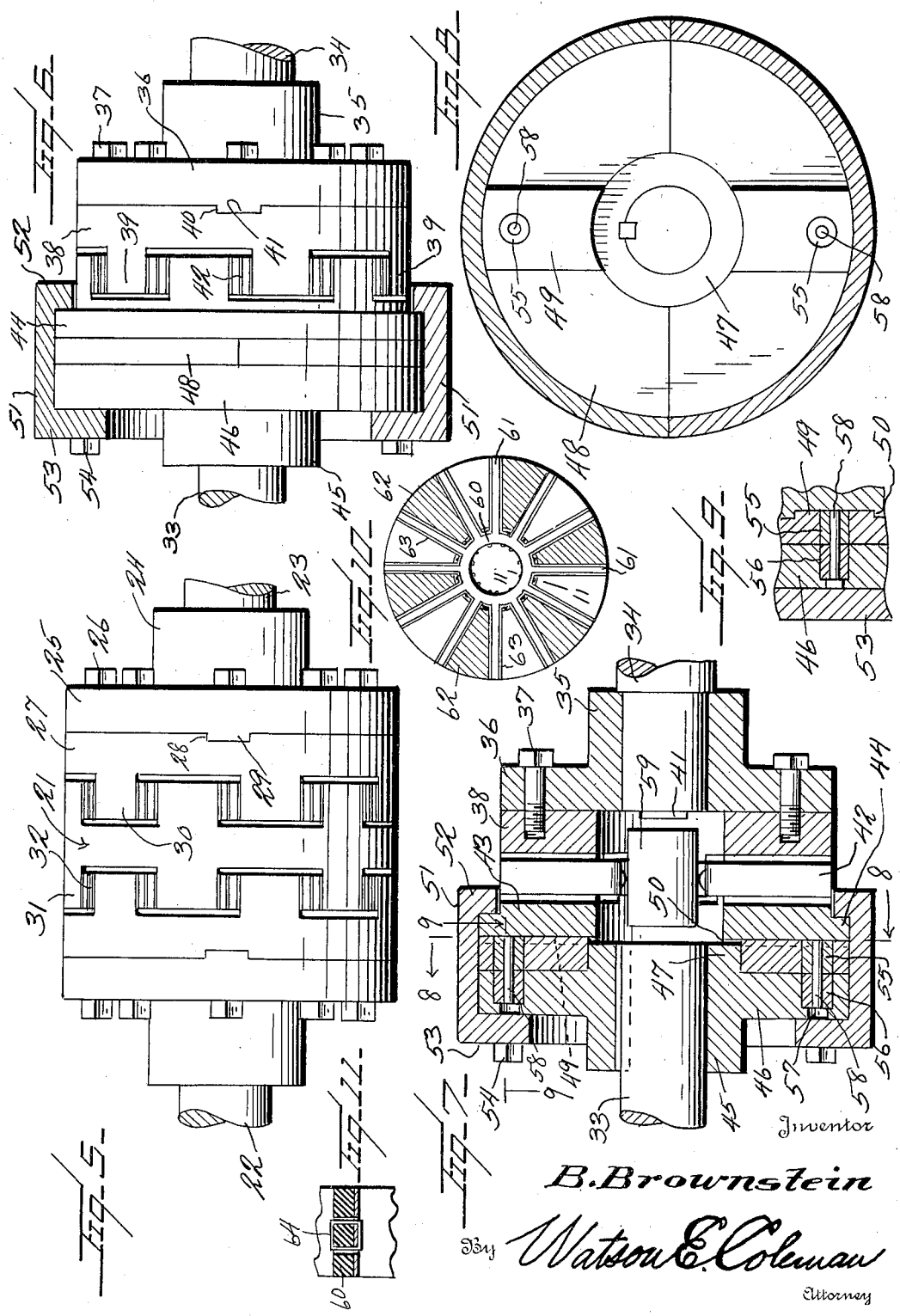
Inventor
B. Brownstein
By Watson E. Coleman
Attorney Patented May 9, 1939

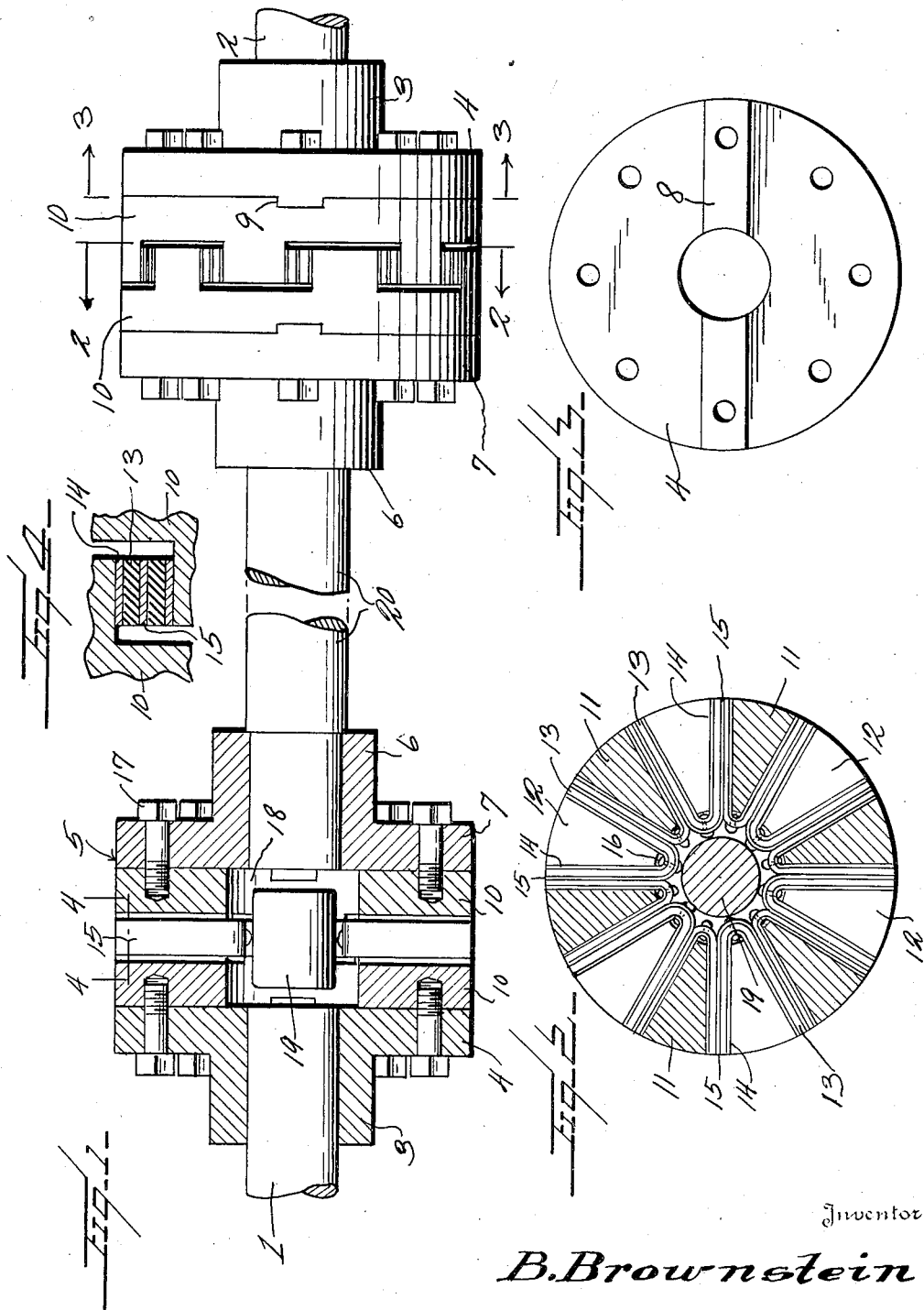

2,157,996

UNITED STATES PATENT OFFICE 2,157,996

UNIVERSAL FLEXIBLE AND SAFETY COUPLING

Benjamin Brownstein, Ellwood City, Pa.

Application August 9, 1938, Serial No. 223,978

8 Claims. (Cl. 64—14)

This invention relates to improvements in shaft couplings and pertains particularly to improvements in flexible couplings.

In the operation of machines where shafts of different machines must be connected together for simultaneous rotation perfect alinement of the shafts is the ideal condition necessary for perfect and smooth operation of the same and the machines with which they are connected but such condition is practically impossible to achieve and hard to maintain for any long duration due to many uncontrollable causes such as variations in height from bottom to center of the shafts and bases of the machines with which they are connected, vibrations causing the machines to move out of alinement in a horizontal path even though they may be assembled on a common base or upon independent bases, the settlement of foundations for the machines, wearing of bearings and shafts and many other causes.

The present invention has for its principal object to compensate for the different conditions enumerated in the provision of a novel universal flexible coupling which allows each of the shafts with which it is joined freedom of rotation under all load operating conditions and which will eliminate shock and vibration at starting at high or low torque and which will permit the operating machine for the shafts to be started, stopped or reversed any number of times without in any way causing undue strains, shocks and vibrations.

A further object of the invention is to provide an improved universal flexible coupling having the above described advantages and which will efficiently take care of misalinement between coupled machines.

Still another object of the invention is to provide a novel universal flexible shaft coupling of the resilient character described, in which replacements of worn parts may be made without necessitating the changing of the alined relation of shafts which the coupling joins together.

A still further object of the invention is to provide a universal flexible shaft coupling having novel resilient and anti-friction elements interposed between interdigitating members in such a manner that the described shock and vibration reducing action is obtained.

Still another object of the invention is to provide a universal flexible shaft coupling having a novel safety feature associated therewith whereby the imposition of too great a torque strain upon the shafts will bring about the disconnection of the same so that one may rotate independently of the other and thereby avoid the possibility of damaging valuable machinery.

Another object of the invention is to provide in a safety coupling of the above described character, a novel construction whereby certain parts of the safety coupling may be replaced after the described shaft disconnection action has occurred, without changing the alined relation of the connected shafts.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view partly in side elevation and partly in longitudinal section of a connection between two shafts made by the use of the improved flexible couplings embodying the present invention, wherein an intermediate floating portion is provided between the said shafts.

Fig. 2 is a sectional view on the line 2—2 of Fig. 1.

Fig. 3 is a sectional view on the line 3—3 of Fig. 1.

Fig. 4 is a sectional view on the line 4—4 of Fig. 1.

Fig. 5 is a view in side elevation of a variation of the form of the present improved coupling as illustrated in Fig. 1.

Fig. 6 is a view partly in side elevation and partly in section of the improved safety coupling.

Fig. 7 is a sectional view longitudinally of the safety coupling shown in Fig. 6.

Fig. 8 is a sectional view on the line 8—8 of Fig. 7.

Fig. 9 is a section taken on the line 9—9 of Fig. 7.

Fig. 10 is a view in transverse section through the coupling unit, corresponding to Fig. 2, but showing a modified or different form of resilient and anti-friction means for insertion between the interdigitating members of the coupling.

Fig. 11 is a sectional view taken on the line 11—11 of Fig. 10.

Referring now more particularly to the drawings, the form of the invention as illustrated in Fig. 1, shows the present improved universal flexible coupling provided with a relatively long central or intermediate floating central portion where as the form of the invention as shown in Fig. 5, shows the coupling with a short intermediate floating portion or center. In the form of the invention as illustrated in Fig. 1, the connected shafts indicated by the numerals 1 and 2 are each provided with or have secured thereon a hub 3 of the flexible coupling with which is integrally formed the flange 4. Each of the flanges 4 of the hubs forms one side of a coupling unit which is indicated generally by the numeral 5, and each unit has in opposed relation with the hub 3, a complementary hub 6 having a flange 7 in opposed axial relation with the adjacent flange 4.

The opposing faces of the hub flanges of each unit are provided with the transverse ribs 8 which, as shown in Fig. 4, are in parallel relation and each of these ribs engages in a channel or groove 9 in the face of an opposing end coupler plate 10.

The opposing faces of the end coupler plates 10 are provided with the radially extending substantially triangular or wedge-shaped lugs or digits 11, which are spaced apart, as shown in Fig. 2, to provide between them corresponding triangular spaces 12. The lugs 11 of the two opposing end coupler plates 10 engage in the recesses 12 of the opposing plate as is clearly shown in Figs. 1 and 5, so that they are disposed in interlocking or interdigitating relation.

Interposed between the interdigitating lugs 11 are resilient and anti-friction strips, the resilient strips being indicated by the numeral 13 while the anti-friction strips are indicated by the numerals 14 and 15. The strips 13 are formed of a suitable resilient material having a rubber base while the anti-friction strips 14 and 15 are preferably formed of lead-coated sheet copper, although it is to be understood that the invention is not to be limited to the use of this particular material as any other suitable anti-friction material may be employed, but the lead-coated soft copper is preferable.

Fig. 2 shows the resilient strips and the anti-friction strips as arranged in alternate relation and bent in the form of a V so as to fit the triangular or wedge-shaped lugs 11 and the several strips are secured together in a suitable manner as by the use of rivets 16, which are passed therethrough at the point of the assembly. This view also shows one anti-friction and resilient unit as consisting of inner and outer anti-friction strips with a resilient strip in between and an adjacent unit as consisting only of a resilient strip with an inner anti-friction strip so that the resilient strip of the second-mentioned unit will bear directly against the anti-friction strips of the two adjacent units. While this arrangement of the units of the anti-friction and resilient strips is preferable, it is to be pointed out that the center anti-friction strips may be left out of all of the units so that the resilient strips will come into abutting relation between the interdigitating lugs.

The end couplers with their interdigitating lugs are secured to the hub flanges between which they are disposed, by suitable bolts 17 which prevent the connected end couplers from shifting radially on the ribs 8 of the flanges between which they are arranged.

As will be readily apparent, the inwardly tapering form of the lugs 11 together with the fact that the lugs are of a length that is greater than half the radius of the end couplers, provides a chamber 18 at the center of each coupling unit 5 between the hubs 3 and 6. In this chamber a cylinder 19 is disposed which is preferably of wood and has its long axis parallel with or common to the axis of the coupling unit. This wooden cylinder or plug maintains the resilient and anti-friction strips in position on their respective lugs 11 and also floats with the parts by the action of the load and misalinement of the machines.

In Fig. 1 of the drawings, the adjacent hubs 6 of the two bearing units 5 are joined by a short intermediate or floating shaft 20, this shaft and the parts 6 and 10 which are coupled directly to it constituting a center or floating coupler between the hubs 3 and the end couplers attached thereto.

The structure illustrated in Fig. 5 is analogous in operation to the structure shown in Fig. 1, except that center or floating coupler described in connection with Fig. 1 is here represented by a lug carrying intermediate coupler which is generally designated by the numeral 21. The flexible coupling of Fig. 5 is interposed between shafts 22 and 23, the adjacent ends of which carry the hubs 24 which are flanged as indicated at 25. These hubs have secured to their opposing faces by the bolts 26, the end coupler plates 27 which are grooved or diametrically recessed as indicated at 28 to receive the diametrically extending retaining ribs 29 which are integral with the faces of the adjacent hub flanges 25. The end couplers 27 are provided with the spaced lugs 30 upon their opposing faces which are the same form as the lugs 11 and these lugs are assembled in intermeshing or interdigitating relation with similarly formed lugs 31 formed integral with the floating center coupler 21 upon the two faces thereof. The interconnected lugs 30 and 31 of the end and center couplers are separated by the resilient and anti-friction members of the same construction as prescribed in connection with Fig. 1, these members being indicated as units by the numeral 32. The central portion of the coupler as illustrated in Fig. 5, carries within it a wooden cylinder or plug (not shown) like the plug 19 shown in Figs. 1 and 2 and operates in the same manner.

With the constructions of the coupler as shown in Figs. 1 to 5, it will be apparent that a certain degree of misalinement may take place between the coupled shafts without interfering in any manner with the transmission of rotary power from one shaft to the other and that the resilient and anti-friction elements will permit relative movement between the interdigitating parts of the couplings and absorb shocks incident to the starting and stopping of the connected shafts.

Through the provision of the rib and groove connection between each end coupler and the adjacent hub flange, it will be apparent that when it becomes necessary to make replacements of the resilient and anti-friction elements of the coupling, such replacements may be readily made without having to change the relative positions of the ends of the coupled shafts by merely removing the bolts which connect the end coupling plates with the flanges whereupon the part of the coupling between the hub flanges may be readily slipped out and then separated so that new anti-friction and resilient elements or inserts may be put into place. From the foregoing the analogy between the coupler structure as shown in Fig. 1 and the one shown in Fig. 5 will be readily apparent in that the part of the structure shown in Fig. 1, which is made up of the intermediate shaft 20, the hubs 6 and the end couplers 10 which are joined to the hubs, constitute a floating center coupler of elongated form while the part 21 of Fig. 5 constitutes a floating center coupler of shortened form.

Thus it will be seen that the floating center coupler may be made short or long and that it can take up any position with reference to its center rotating axis and the axis of the end couplers upon either side thereof. In other words, the center coupler can be made to make an angular connection with the end couplers and maintain that connection throughout the 360° of its rotation. Thus the feature of the center coupler makes the entire coupling a universal coupling.

In Figs. 6 to 8, inclusive, the resilient coupler is shown in association with a safety construction whereby the imposition by the drive shaft, which may be indicated by the numeral 32, of an excessive torque upon the driven shaft 34 may be relieved, where such excessive torque might endanger other mechanical connections, by the yielding of brake pins hereinafter described.

In this safety coupling there is employed a hub 35 having a flange 36 as in the other forms of the coupling and the hub flange is connected by bolts 37 with an end coupler plate 38 having the lugs 39 and held against a tendency to rotate independently of the flange 36 by the groove and rib connection 40—41. The anti-friction and resilient inserts are associated with the lugs 39 as indicated at 42 and opposing the end coupler 38 is a modified end coupler 43 which is formed to provide the encircling flange 44. Opposing the modified end coupler 44 is a modified hub and flange unit, the two parts, the hub and the flange, being indicated respectively by the numerals 45 and 46. In this modified hub and flange structure, the flange is moved back from the outer end of the hub to form or provide the collar 47 which is encircled by a split annulus 48 which has that face which is opposed to and in contact with the modified end coupler 43, provided with the diametrical rib 49 which engages in a corresponding groove 50 formed across the modified end coupler.

The split ring 48 is of the same overall diameter as the modified hub flange 46 and modified end coupler 43, as shown in Figs. 6 and 7, and these three elements are retained in the assembled relation shown by the split shell 51 which has the inturned end flanges 52 and 53 which engage respectively against the outer side of the flange 44 of the modified end coupler and the remote side of the flange 46 of the modified hub. Cap screws 54 are passed through the flange 53 of the coupling shell into the flange 46 of the modified hub so as to secure these parts together in the concentric relation shown.

Each half of the split ring 48 is provided with a suitable transverse bore to receive a bushing 55 and similar bores are formed in the flange 46 to receive similar bushings 56. The ends of the bores in which the bushings 56 are located are of slightly reduced diameter, as indicated at 57. These bushings 55 and 56 are in end abutting relation and they have extended through them the shear pins 58 which are inserted through the reduced ends 57 of the bores in which the bushings 56 are placed.

From the description given of the safety flexible coupling, it will be seen that the torque or load will be transmitted from the modified hub and flange 45—46 through the shear pins 58 to the coupler at the opposite side of the split ring 48. When the load on the drive shaft becomes increased beyond a predetermined amount, the shear pins will shear and release the hub from the split ring and coupler, thus making them free to move or stand still as the conditions may require. The parts of the split ring, while free to move outwardly or to separate, are locked to the modified coupler 43 by the key or rib 49 and groove 50. When the shear pins have become broken under the conditions described, new pins may be put into place without having to disassemble the coupling structure. This is accomplished by removing the cap screws 54 and separating the two parts of the split shell 51, thus exposing the parts of the split ring 48 and making it possible to separate them, each part bringing out with it the bushing 55 and one-half of the shear pin. The other half of each shear pin may then be shoved out of the bushing 56 in which it is located and if it is not necessary to replace the bushings, then the two halves of the split ring may be slipped back into position to encircling relation with the collar 47 and new shear pins are inserted through the bores 57 to pass through and couple together the alined bushings 55 and 56. After the shear pins are properly placed, then the split shell is replaced and secured to the hub flange 46 as previously described.

In this safety flexible coupling there is employed the wooden cylinder or plug as in the other forms, this cylinder being indicated by the numeral 59 and operating to maintain the anti-friction and resilient members in position and further assist in maintaining the desired alinement of the adjacent relatively movable parts.

In Fig. 10 there is shown another form in which the resilient members and anti-friction members may be constructed. In this form, the resilient spacing means between the interdigitating members of a pair of coupling units, such, for example, as an end coupler and a center coupler or the interdigitating members of two end couplers of the type shown in Fig. 1, is constructed as a single molded spider, consisting of a central ring portion 60 from which extend the radial resilient fingers 61 which are located between the opposing faces of the interconnected coupling members. The ring portion lies, of course, at the tapered inner ends of the interconnected members, one set only of which is shown and which is indicated by the numeral 62 so that each of the members 62, as well as those of the opposing coupling, lies within the crotch formed by a pair of the resilient fingers 61. Disposed in this crotch between each two adjacent members or fingers 61 is the V-shaped or formed anti-friction member or strip 63 and the inner end of this member is secured to the ring portion 60 of the resilient unit by a wire 64 or in any other suitable manner.

From the foregoing, it will be readily apparent that the universal flexible coupling and the universal flexible safety coupling disclosed will efficiently take care of mechanical misalinement of connected shafts either horizontally, vertically and angularly and in addition to eliminating shock and vibration incident to starting and stopping of the coupled shafts and providing a smooth working together of the interdigitating parts, provides a novel safety means in the assemblage shown in Fig. 7 where the flexible coupling and safety coupling are combined as a unit.

What is claimed is:—

1. A shaft coupling, comprising a pair of hub members adapted to be secured to adjacent shaft ends and each having an integral lateral flange, said flanges having opposing faces, coupler plates arranged concentrically with and between the opposing faces of the flanges, key means extending diametrically across the contacting faces of the couplers and flanges, lug members carried by said couplers upon the opposing sides thereof and having interdigitating relation with one another, resilient and anti-friction inserts between said interdigitating members, and means securing the couplers to the flanges preventing movement of the couplers transversely of the shafts on said keys.

2. A shaft coupling, comprising a pair of hub members adapted to be secured to adjacent shaft ends and each having an integral lateral flange, said flanges having opposing faces, coupler plates arranged concentrically with and between the opposing faces of the flanges, key means extending diametrically across the contacting faces of the couplers and flanges, lug members carried by said couplers upon the opposing sides thereof and having interdigitating relation with one another, resilient and anti-friction inserts between said interdigitating members, and means securing the couplers to the flanges preventing movement of the couplers transversely of the shafts on said keys, said interdigitating members being in the form of triangular bodies upon the opposed faces of the couplers and tapering toward the rotary center of the shafts and extending radially.

3. A shaft coupling, comprising a pair of hub members adapted to be secured to adjacent shaft ends and each having an integral lateral flange, said flanges having opposing faces, coupler plates arranged concentrically with and between the opposing faces of the flanges, key means extending diametrically across the contacting faces of the couplers and flanges, lug members carried by said couplers upon the opposing sides thereof and having interdigitating relation with one another, resilient and anti-friction inserts between said interdigitating members, and means securing the couplers to the flanges preventing movement of the couplers transversely of the shafts on said keys, said interdigitating members being in the form of triangular bodies upon the opposed faces of the couplers and tapering toward the rotary center of the shafts and extending radially, and said resilient and anti-friction units comprising resilient inserts between the opposing faces of the interdigitating members and metallic strips interposed between the resilient inserts and the triangular members upon the two sides thereof.

4. A universal flexible shaft coupling, comprising a pair of flanged hubs adapted to be secured to adjacent ends of a pair of shafts, said flanges having opposed faces, a coupler plate disposed against each of the opposed flange faces, a plurality of elongated lugs integral with the opposing faces of said coupler plates and disposed around and substantially radially of the rotary center of the coupling, an intermediate floating coupler between said coupler plates and having a plurality of elongated lugs upon opposite sides thereof disposed around and extending radially of the rotary center of the coupling, the lugs of the floating intermediate coupler being in interdigitating relation with the end couplers, resilient and anti-friction inserts between the opposed faces of the interdigitating lugs, key coupling means between each end plate and the adjacent hub flange, and means securing the hub flanges to the adjacent coupler plates, said key means of the two flanges being parallel and facilitating the withdrawal of the intermediate and end couplers as a unit from between the flanges when the said securing means is removed.

5. A shaft coupling, comprising a pair of flanged hubs adapted to be secured to adjacent shaft ends with the flanges thereof in opposed relation, a plurality of elongated lugs carried by each hub flange upon the said face thereof and disposed about and extending radially of the rotary center of the hub, a floating intermediate coupler between the flanges comprising a short shaft, a flanged hub secured to each end of the short shaft and having a face opposing one of the first hub flanges, a coupler plate secured to the said faces of the short shaft carried flanges, elongated lug members disposed integral with each of said coupler plates upon the faces thereof opposing the first-mentioned flanges and disposed about and extending radially of the rotary centers of the coupler plates and having interdigitating relation with the lugs of the adjacent hub flanges, resilient and anti-friction means interposed between the interdigitating lugs, means for securing the coupler plates to the intermediate shaft carried flanges, and key means coupling the coupler plates with the intermediate shaft carried flanges and extending diametrically of the coupler plates.

6. In a coupling of the character described, comprising a pair of plate members each adapted to be secured to a shaft end and having on their opposing faces a series of inwardly tapering wedge members disposed around and extending radially of the rotary axis of the plate, the wedge members being in interdigitating relation, shock absorbing and anti-friction units spacing the interdigitating wedge members, comprising substantially V-shaped bodies of resilient material, and a substantially V-shaped member of anti-friction strip metallic material nesting in the V-shaped resilient material each of said wedge members extending into the nested V-shaped bodies to have its opposite tapered faces covered thereby.

7. In a coupling of the character described, comprising a pair of plate members each adapted to be secured to a shaft end and having on their opposing faces a series of inwardly tapering wedge members disposed around and extending radially of the rotary axis of the plate, the wedge members being in interdigitating relation, shock absorbing and anti-friction units spacing the interdigitating wedge members, comprising substantially V-shaped bodies of resilient material and a substantially V-shaped member of anti-friction strip metallic material nesting in the V-shaped resilient material, each of said wedge members extending into the nested V-shaped bodies to have its opposite tapered faces covered thereby, said resilient bodies being joined at their inner ends by an integral ring of resilient material.

8. In a coupling of the character described, comprising a pair of plate members each adapted to be secured to a shaft end and having on their opposing faces a series of inwardly tapering wedge members disposed around and extending radially of the rotary axis of the plate, the wedge members being in interdigitating relation, shock absorbing and anti-friction units spacing the interdigitating wedge members, comprising substantially V-shaped bodies of resilient material, a substantially V-shaped member of strip metallic material nesting in the V-shaped resilient material, each of said wedge members extending into the nested V-shaped bodies to have its opposite tapered faces covered thereby, and a substantially V-shaped strip of anti-friction metallic material overlying the outer convergent faces of alternate ones of the V-shaped resilient members.

BENJAMIN BROWNSTEIN.